(12) United States Patent
Suenaga

(10) Patent No.: US 6,950,626 B2
(45) Date of Patent: Sep. 27, 2005

(54) RECEIVER HAVING RETRANSMISSION FUNCTION

(75) Inventor: Syoji Suenaga, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 362 days.

(21) Appl. No.: 10/095,120

(22) Filed: Mar. 12, 2002

(65) Prior Publication Data

US 2002/0146984 A1 Oct. 10, 2002

(30) Foreign Application Priority Data

Mar. 13, 2001 (JP) ........................................ 2001-070057

(51) Int. Cl.[7] ................................................ H04R 5/00
(52) U.S. Cl. ........................ 455/41.2; 455/3.01; 455/23
(58) Field of Search .............................. 455/277.1, 270, 455/344, 345, 269, 41.2, 41.3, 3.01, 3.02, 7, 20, 23

(56) References Cited

U.S. PATENT DOCUMENTS

| | | | | |
|---|---|---|---|---|
| 4,251,690 A | * | 2/1981 | Takahashi et al. | ............ 381/11 |
| 5,119,503 A | * | 6/1992 | Mankovitz | .................... 455/45 |
| 5,777,997 A | * | 7/1998 | Kahn et al. | .................. 370/493 |
| 6,272,328 B1 | * | 8/2001 | Nguyen et al. | .......... 455/277.1 |
| 6,714,551 B1 | * | 3/2004 | Le-Ngoc | ..................... 370/401 |

FOREIGN PATENT DOCUMENTS

| | | | |
|---|---|---|---|
| EP | 0 776 096 A2 | 5/1997 | |
| EP | 0 949 771 A2 | 10/1999 | |
| JP | 06-268936 | 9/1994 | |
| JP | 10-145253 | * 5/1998 | ............ H04B/1/20 |
| JP | 11-331000 | 11/1999 | |

* cited by examiner

Primary Examiner—Lee Nguyen
(74) Attorney, Agent, or Firm—McGinn & Ginn, PLLC

(57) ABSTRACT

A receiver having a retransmission function is provided for alleviating a degradation in the S/N ratio in an FM radio wave for retransmitting an audio signal extracted from a digital broadcasting radio wave even if a receiving situation deteriorates. When the receiving situation is satisfactory, a modulation level is increased during frequency modulation upon retransmission. When the receiving situation deteriorates, the modulation level is reduced. Simultaneously, depending on the varying receiving situation, the processing performed on the audio signal is switched to monophonic or stereophonic.

19 Claims, 5 Drawing Sheets

RECEIVER HAVING RETRANSMISSION FUNCTION

BACKGROUND OF THE INVENTION

1. Field of the Invention

The present invention relates to a receiver which receives a broadcast radio wave, performs a variety of modulation processing on an audio signal included in the broadcast radio wave, and retransmits the audio signal on a radio wave different from the received radio wave.

2. Description of the Related Art

In recent years, new forms of information media have increased, such as the satellite broadcasting, digital broadcasting and the like. It is quite useless to purchase tuners dedicated to these new media and further provide audio equipment such as an amplifier, speakers, and the like for each tuner because the devices become duplicated. This also creates space problems for installing new devices, and cables which should be routed and connected between components. Particularly, the problem is severe for vehicle-equipped devices because a vehicle has only a limited space available for equipment.

To cope with this problem, some conventionally known receivers for television broadcasting and satellite broadcasting, have a function of extracting only an audio signal from received and reproduced information signals, frequency modulating (FM) the audio signal, and retransmitting the frequency modulated audio signal as a weak radio wave (see Laid-open Japanese Patent Applications Nos. 6-268936, 11-331000). These receivers having a retransmission function generally set the frequency of a FM radio wave to be retransmitted within the frequency band of the FM broadcasting (76–90 MHz in Japan). Therefore, a receiver having such a function permits the user to hear only an audio signal extracted from the television broadcasting and satellite broadcasting, using an ordinary FM radio.

However, when these receivers having the retransmission function experience a deteriorated receiving state of an originally received radio wave, the quality of an audio signal extracted from the received radio wave is also degraded. As a result, the S/N ratio becomes lower in the audio signal included in a retransmitted FM radio wave.

Therefore, with a television receiver for analog broadcasting having such a function, a deteriorated receiving situation results in a gradual increase in noise in an audio signal included in a retransmitted FM radio wave. On the other hand, with a receiver for digital broadcasting, which performs an error correction during a receiving and reproducing operation, noise will not increase even if the receiving situation deteriorates to some degree. However, when the deteriorated receiving situation exceeds a limit of the error correction, the reception quality suddenly degrades. This results in a sudden increase in noise in an audio signal included in a retransmitted FM radio wave.

OBJECT AND SUMMARY OF THE INVENTION

It is an object of the present invention to provide a receiver having a retransmission function which prevents the S/N ratio of a signal to be retransmitted from degrading, even if a receiving situation of an originally received radio wave deteriorates.

The present invention provides a receiver with a retransmission function which has a receiving/reproducing part for receiving a broadcast radio wave and reproducing an audio signal included in the broadcast radio wave, a receiving situation determining part for determining a receiving situation of the broadcast radio wave, and a modulating/transmitting part for performing predetermined modulation processing on the audio signal, and retransmitting the processed audio signal on a broadcast radio wave different from the received broadcast radio wave, wherein the modulating/transmitting part performs a variety of modulation processing in accordance with a determination result in the receiving situation determining part.

DETAILED DESCRIPTION OF THE PREFERRED EMBODIMENT

Figure 1:
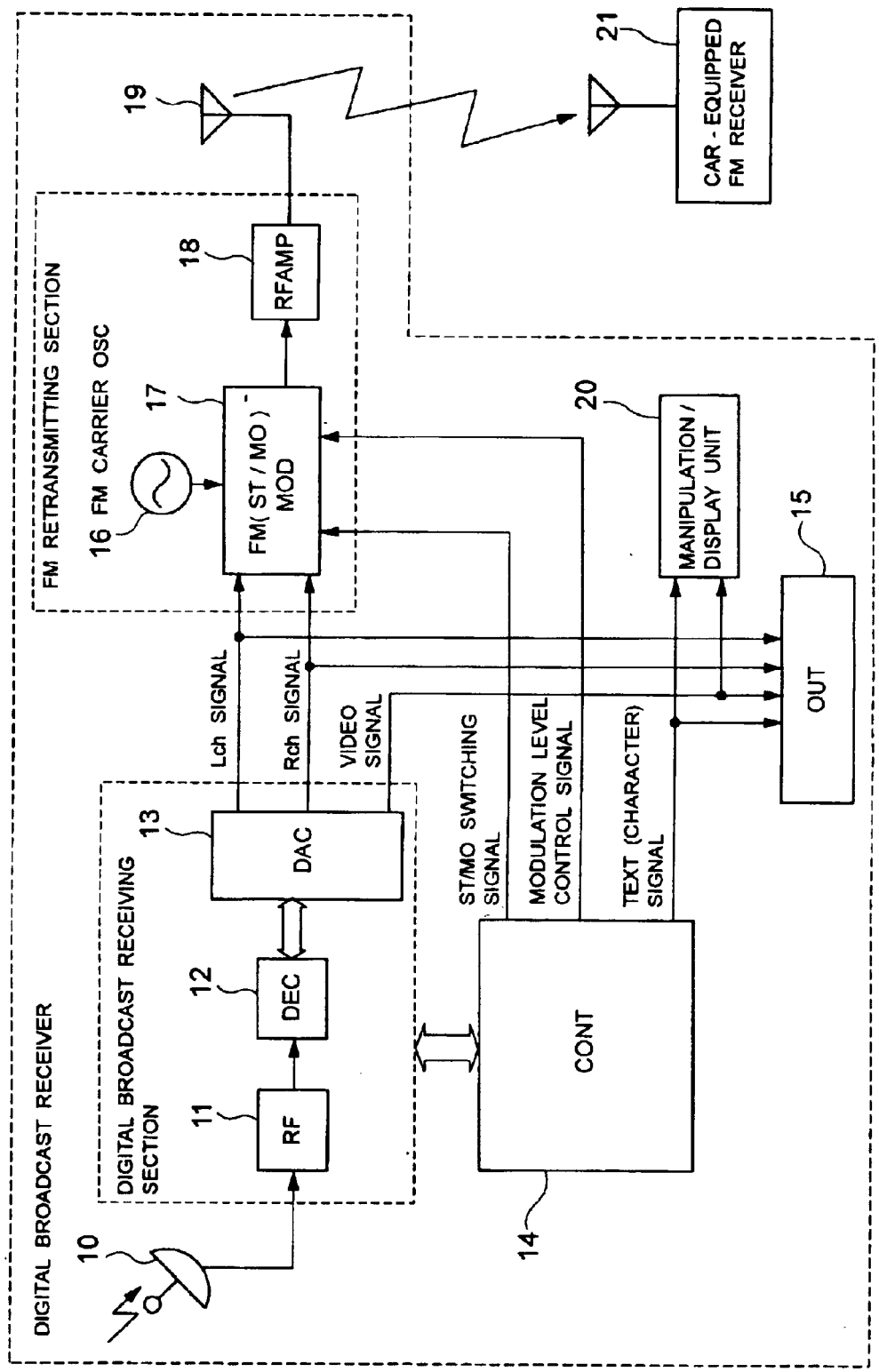
FIG. 1 is a block diagram illustrating the configuration of a digital broadcast receiver having a retransmission function according to an embodiment of the present invention.

FIG. 1 is a block diagram illustrating the configuration of a digital broadcast receiver according to an embodiment of the present invention.

In FIG. 1, a digital broadcast reception antenna 10 is an antenna for receiving digital broadcasting radio waves, for example, satellite waves and terrestrial waves.

An analog demodulator unit 11 is a so-called radio frequency (RF) processing unit comprised of a frequency converter circuit, a tuning circuit, a detector/demodulator circuit, and the like. A digital demodulator unit 12, which is comprised of a variety of digital decoding circuits, an error correcting circuit and the like, is a unit responsible for demodulation and reproduction processing of a digital signal. A digital/analog converter unit (hereinafter called the D/A converter unit) 13 is a circuit for converting an audio signal and a video signal included in a reproduced digital signal to analog signals. The foregoing units constitute a digital broadcast receiving section in this embodiment.

A control unit 14 is mainly comprised of a microcomputer and a memory circuit. The memory circuit is comprised of memory devices such as a ROM (Read Only Memory), a RAM (Random Access Memory) and the like. The microcomputer in the control unit 14 executes a predetermined control program stored in the ROM, based on an internal clock signal. Then, the control unit 14 governs the control of the overall digital broadcast receiver illustrated in FIG. 1. Specifically, the control unit 14 controls the respective units of the aforementioned digital broadcast receiving section. Simultaneously, the control unit 14 receives the supply of text data (received character information), which is demodulated and reproduced from the receiving section, and a variety of data indicative of a receiving situation. Then, the control unit 14 executes a variety of processing required by the digital broadcast receiver.

An information output unit 15 governs conversion processing for data formats and signal forms for an audio signal, a video signal, a text (character) signal and the like reproduced from a received digital broadcast radio wave.

The converted signal is output to an external device, for example, speakers, a large sized display and the like, external to the digital broadcast receiver.

A manipulation/display unit 20 is comprised of a manipulation/display panel and an interface circuit. Then, the manipulation/display panel comprises a manipulation unit comprised of a variety of push buttons, numeral keys and the like, and a display unit comprised of a variety of LEDs, a liquid crystal display, and the like.

The user can control the receiver through the manipulation/display unit 20. The user can also monitor the state of the receiver, and received information on texts (characters), video and the like through the manipulation/display unit 20.

An FM carrier oscillator unit 16 is a unit for generating a carrier for retransmitting an audio signal extracted from the received digital broadcast radio wave as an FM radio wave. The FM carrier oscillator unit 16 may be comprised of a highly accurate oscillator circuit which uses a piezoelectric resonance element, for example, a quartz element, a ceramic element, or the like.

A frequency modulation unit 17 performs stereophonic modulation processing or monophonic modulation processing on an audio signal output from the D/A converter unit 13. Subsequently, the frequency modulation unit 17 uses this processed signal as a modulating signal to frequency modulate the carrier from the FM carrier oscillator unit 16.

A modulation factor during frequency modulation is controlled by a modulation level control signal supplied from the control unit 14. On the other hand, switching to the stereophonic modulation processing or monophonic modulation processing is controlled by a stereophonic/monophonic switching signal (hereinafter called a ST/MO switching signal) supplied from the control unit 14. These signals are generated by the control unit 14 based on a received signal quality acquired from the digital demodulator unit 12.

A retransmission amplifying unit 18 is a unit for performing high frequency output processing on an output signal from the frequency modulation unit 17. Here, high frequency output processing refers to processing such as frequency multiplication, high frequency amplification and the like. The foregoing FM carrier oscillator unit 16, frequency modulation unit 17 and retransmission amplifying unit 18 constitute an FM retransmitting section in this embodiment.

A retransmission antenna 19 is an antenna for radiating an FM radio wave output from the aforementioned FM retransmitting section. The FM radio wave retransmitted in this embodiment is a weak radio wave which does not require a license. Generally, a car-equipped FM receiver for receiving this radio wave is also located quite near the receiver according to this embodiment. For this reason, the retransmission antenna 19 may be omitted.

Though not included in the receiver in this embodiment, a car-equipped FM receiver 21 is also required as a device for receiving a retransmitted FM radio wave. Such a receiver may be any one that can receive stereo broadcasting in an FM broadcasting band (76–90 MHz in Japan). Since such a receiver can be generally implemented by widely used devices such as a car radio, car stereo tuner or the like, description thereof is omitted.

The processing operation in the receiver of the embodiment illustrated in FIG. 1 will be described below.

A digital broadcast radio wave received by the digital broadcast reception antenna 10 is detected and demodulated in the analog demodulator unit 11, and supplied to the digital demodulator unit 12.

The digital demodulator unit 12 demodulates an analog output from the analog demodulator unit 11 to a digital signal. Then, the demodulated signal undergoes reproduction processing such as deinterleaving, which is a rearrangement of a digital signal sequence, error detection, error correction and the like. Out of the reproduced digital signals, text(character) data, and code data associated therewith are output from the digital broadcast receiving section to the control unit 14 together with other information indicative of a variety of receiving situations.

In parallel with the foregoing processing, the digital demodulator unit 12 outputs the reproduced digital signal to the D/A converter unit 13. The D/A converter unit 13 converts this digital signal to an analog signal. For reference, such an analog signal includes an audio signal and a video signal. The audio signal is output to the frequency modulation unit 17 and information output unit 15. The video signal in turn is output to the information output unit 15 and manipulation/display unit 20.

Generally, an audio signal is typically transmitted in stereophony in the digital broadcasting. Therefore, the audio signal is reproduced as an Right-channel signal and a Left-channel signal (hereinafter called an R-ch signal and a L-ch signal) of stereophony, and output from the D/A converter unit 13 to the FM retransmitting section.

The R-ch and L-ch signals from the D/A converter unit 13 are input to the frequency modulation unit 17 in the FM retransmitting section. The frequency modulation unit 17 is comprised of a part responsible for the stereophonic modulation processing, and a part responsible for the frequency modulation processing. The former includes an R/L matrix circuit required from the stereophonic transmission, and an oscillator circuit for oscillating a main carrier and a sub-carrier of the stereophonic signal. The latter includes a frequency modulation circuit for modulating the carrier using a modulating signal which has undergone the stereophonic modulation processing.

Specifically, the frequency modulation unit 17 performs the stereophonic modulation processing using the R-ch and L-ch audio signals. On the other hand, the frequency modulation unit 17 may performs the monophonic modulation processing, as well as the stereophonic modulation processing, depending on a receiving situation of digital broadcasting. Here, the monophonic modulation processing refers to processing for generating a main channel signal for stereophonic transmission comprised of the sum of the R-ch and L-ch audio signals.

Whether the frequency modulation unit 17 selects the stereophonic or monophonic modulation processing mode is determined by the ST/MO switching signal supplied from the control unit 14.

Subsequently, the frequency modulation unit 17 performs frequency modulation on the carrier supplied from the FM carrier oscillator unit 16, using the modulating signal which has undergone the stereophonic modulation processing or monophonic modulation processing. As to the frequency modulation scheme, the foregoing modulating signal may be applied to a gate of a reactance varying element in a circuit which is supplied with the carrier. Alternatively, a variable capacitance diode may be connected in parallel with a carrier tuning circuit to superpose the modulating signal on a direct current bias voltage of the diode. A level of the modulation factor in the frequency modulation processing, i.e., the magnitude of the modulation level is controlled by a modulation level control signal supplied from the control unit 14.

The ST/MO switching signal and modulation level control signal are generated by the control unit 14 based on the received signal quality acquired from the digital demodulator unit 12.

The retransmission amplifying unit 18 is a high frequency amplifying unit comprised of a frequency multiplier circuit, a buffer amplifier circuit, and the like. A modulated carrier signal output from the frequency modulation unit 17 is multiplied to have a predetermined frequency in the retransmission amplifying unit 18. Then, the modulated carrier signal is amplified to a proper signal level, and then radiated from the retransmission antenna 19. In this embodiment, the retransmitted FM radio wave is a so-called weak radio wave which has an extremely low signal level. Therefore, the retransmission amplifying unit 18 may be omitted by previously setting the oscillating frequency of the FM carrier oscillator unit 16 to a value within the FM broadcasting band (76–90 MHz in Japan).

Next, the processing operation when a receiving situation of the received digital broadcast radio wave changes, in the embodiment of FIG. 1, will be described with reference to a flow chart of FIG. 2.

The microcomputer within the control unit 14 executes at all times a main routine program (not shown) for controlling the operation of the overall digital broadcast receiver illustrated in FIG. 1. Meanwhile, the microcomputer repeatedly executes a subroutine program illustrated in FIG. 2 as appropriate.

Figure 2:
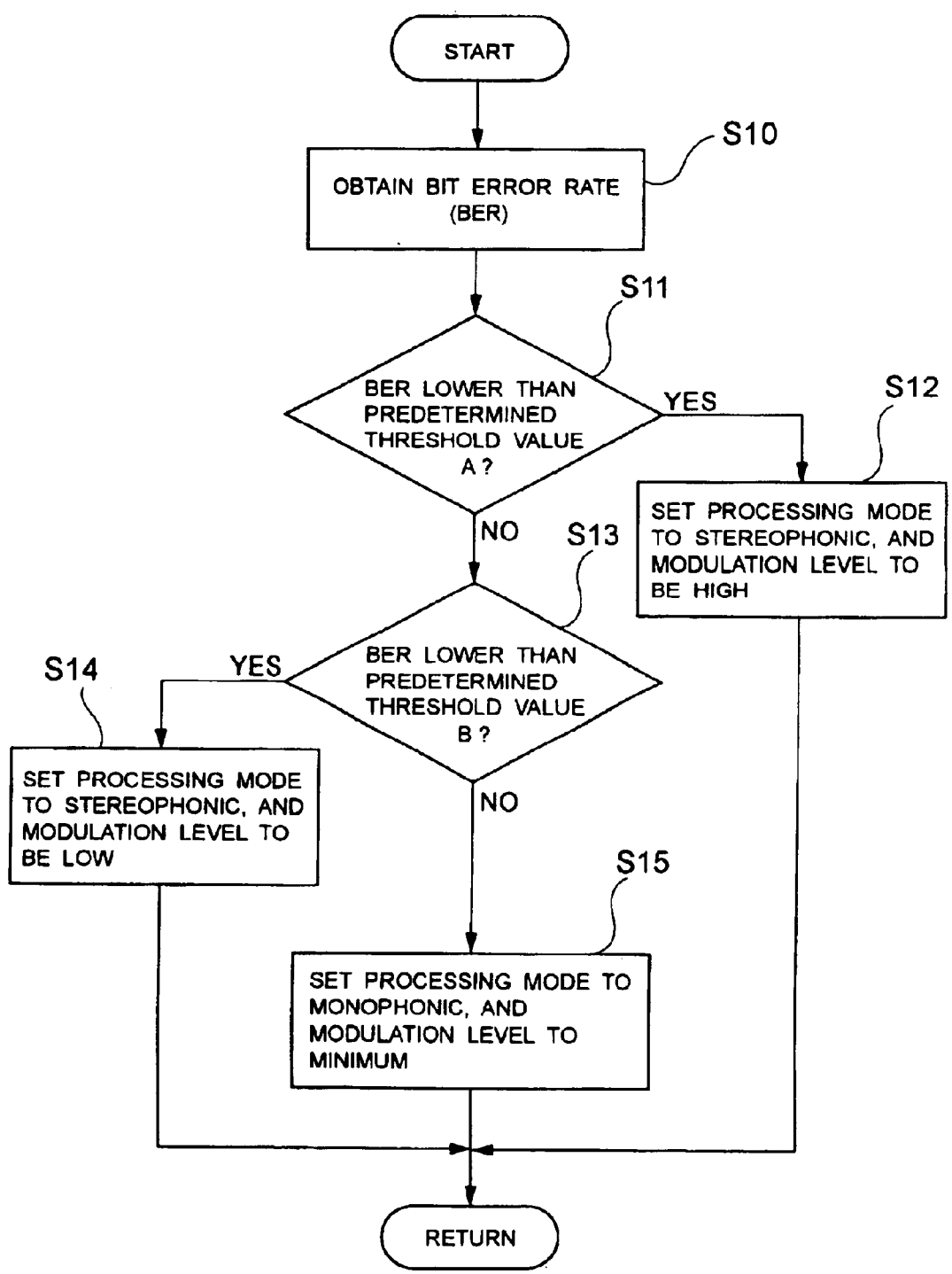
FIG. 2 is a flow chart illustrating the operation for controlling modulation processing in a retransmitting section in the embodiment illustrated in FIG. 1.

The subroutine in FIG. 2 illustrates the control operation for the modulation processing in the FM retransmitting section in FIG. 1. This subroutine may be periodically initiated by a built-in timer of the microcomputer. Alternatively, the subroutine may be initiated each time the control unit 14 receives received reproduced data and receiving situation data associated therewith from the digital broadcast receiving section.

In the subroutine of FIG. 2, the microcomputer (hereinafter simply called the μCPU) of the control unit 14 first obtains a bit error rate (hereinafter simply called the BER) from the receiving situation data received from the digital broadcast receiving section (step 10). The BER corresponds to an error rate of received data detected in the digital demodulator unit 12 when errors in the received data are corrected. For example, when one bit of error is found within 100 bits of received data, BER=1%.

Figure 3:
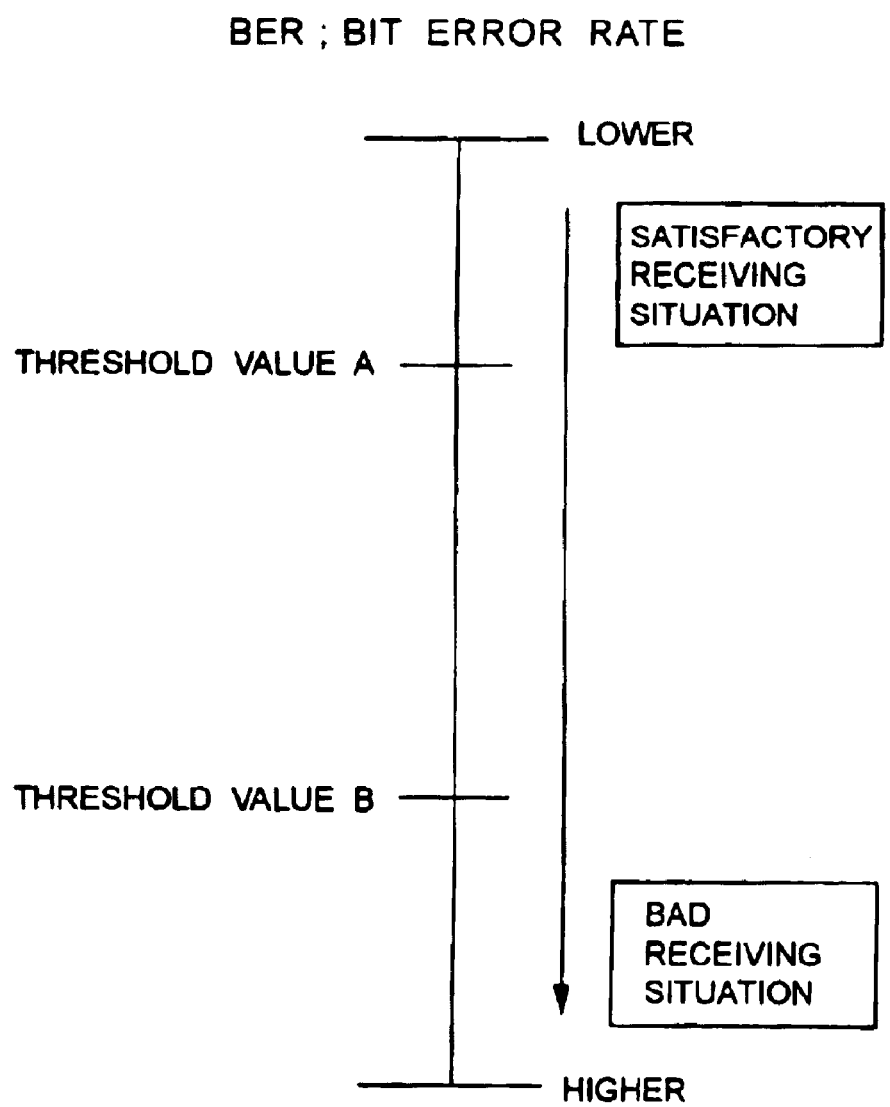
FIG. 3 is an explanatory diagram showing the relationship between a bit error rate and a receiving situation and a predetermined threshold value.

The μCPU compares the obtained value of BER with a predetermined threshold value A previously stored in the memory of the control unit 14 at next step 11. The relationship between the predetermined threshold value A and BER is as shown in FIG. 3. Specifically, the value of BER is smaller as the receiving situation improves. Then, the receiving situation deteriorates as the value of BER gradually increases. In FIG. 3, the receiving situation is quite satisfactory if BER is lower than the threshold value A. On the other hand, when BER is equal to greater than a threshold value B, this indicates that the receiving situation is extremely bad or the digital broadcasting cannot be received.

If the value of BER is lower than the threshold value A at step 11, i.e., if the receiving situation is quite satisfactory, the μCPU proceeds to step 12. Then, the μCPU sets the modulation processing mode of the frequency modulation unit 17 in the FM retransmitting section to the stereophonic modulation processing. Further, the μCPU sets the modulation level during the frequency modulation to be high in the modulator unit 17. The modulation level used herein refers to an index indicative of the magnitude of a frequency deviation of a modulating signal during the frequency modulation of the frequency modulation unit 17. Specifically, a higher modulation level means a wider frequency band of the modulating signal. On the other hand, a lower modulation level means a narrower frequency band of the modulating signal.

Stated another way, when the receiving situation is satisfactory, the control unit 14 outputs the ST/MO switching signal instructing the stereophonic modulation processing, and the modulation level control signal instructing a high modulation level to the frequency modulation unit 17 based on the settings at step 12.

Figure 4:
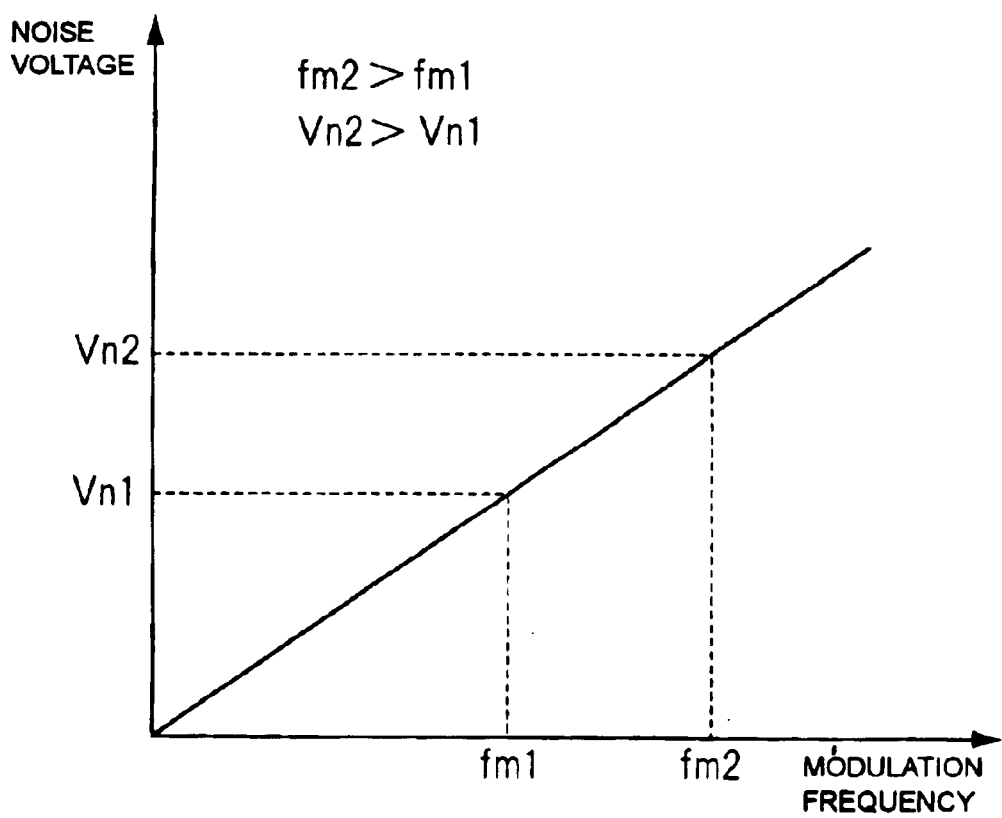
FIG. 4 is an explanatory diagram showing the relationship between a modulation frequency and a resulting noise voltage in the FM modulation processing.

It is known that when an input level of the antenna decreases to a fixed value or lower upon receipt of an FM radio wave, a stereophonic modulated signal suffers from a more degraded S/N ratio as compared with a monophonic modulated signal. This is an inherent nature of the FM radio wave, and originates in a so-called triangular noise characteristic, as shown in FIG. 4. Here, the triangular noise characteristic refers to a noise voltage in an FM radio wave which increases in proportion to the frequency of a modulating signal.

Specifically, for the monophonic modulation processing, a main channel (L-ch+R-ch) signal maximally having a band of 15 kHz may be used for the modulating signal for the frequency modulation. In contrast, when the stereophonic modulation processing is performed, a sub-channel (L-ch−R-ch) must be transmitted in addition to the main channel signal. Then, the sub-channel signal requires double sideband waves of maximally having a band of 23–53 kHz, about the stereophonic subcarrier (38 kHz).

Figure 5:
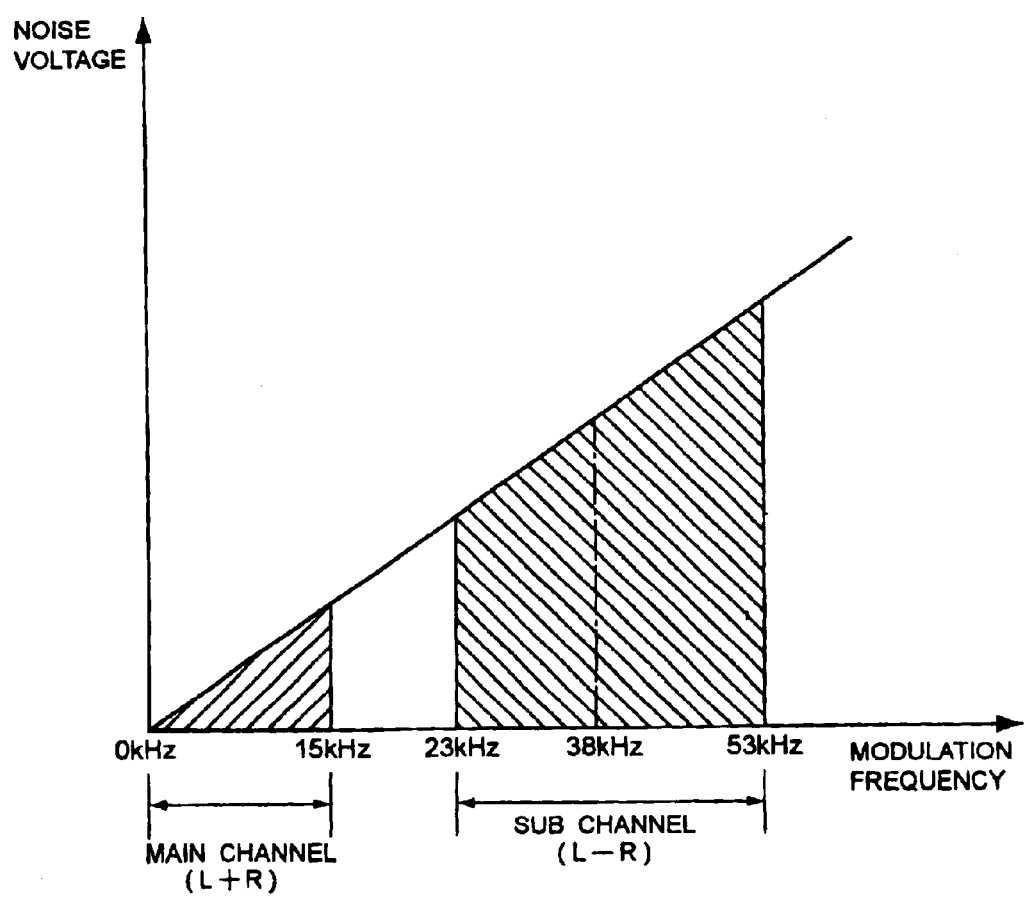
FIG. 5 is an explanatory diagram showing the relationship between a stereo/monophonic modulation processing mode and a noise voltage in the frequency modulation.

Thus, when the stereophonic modulation processing is performed, the frequency band of the modulating signal extends 53 kHz at maximum, which is the sum of the (L-ch+R-ch) signal and (L-ch−R-ch) signal. This is because the stereophonic modulation processing results in increased triangular noise as compared with the monophonic modulation processing, as shown in FIG. 5.

As described above, a value of BER lower than the threshold value A indicates that the receiving situation of the digital broadcasting is quite satisfactory. In such a situation, it is contemplated that the audio signal extracted from the received radio wave of the digital broadcasting also has a satisfactory signal quality. Therefore, with such an audio signal of high quality, even if the modulation level is set to be high and the stereophonic modulation processing is performed in the frequency modulation unit 17, a resulting increase in the noise level can be ignored. In other words, when the receiving situation is satisfactory, the degraded S/N ratio will not cause any problem in the FM retransmitted signal even if the stereophonic modulation processing is performed with a high modulation level.

Also, by performing the modulation processing in the FM retransmitting section in FIG. 1, a listener can enjoy an audio signal extracted from the digital broadcasting as broadband stereophony broadcasting, using an FM radio.

The μCPU in the control unit 14 terminates the subroutine of FIG. 2 and returns to the main routine when the settings at step 12 are completed.

On the other hand, if BER is higher than the predetermined threshold value A at step 11, the μCPU determines whether or not BER is lower than the predetermined threshold value B (step 13). Then, if BER is lower than the predetermined threshold value B, i.e., the value of BER satisfies A<BER<B, the μCPU proceeds to step 14.

When the value of BER lies within the foregoing range, the receiving situation in the digital broadcast receiving section is not so satisfactory as that which was found at the aforementioned step 12, as is also apparent from FIG. 3. However, the receiving situation in the digital broadcast receiving section ensures a predetermined level. It is therefore contemplated that the signal quality of the audio signal extracted from the received radio wave still maintains a predetermined level even though the noise has increased to some degree.

In view of such a signal quality, the μCPU maintains the modulation processing mode in the frequency modulation unit 17 set to the stereophonic modulation processing, and sets the modulation level of the frequency modulation to be low. In other words, in the FM radio wave for retransmitting the audio signal extracted from the received digital broadcasting, the form of transmitting the signal in stereophony is maintained. However, the band of the modulating signal frequency is narrowed during the frequency modulation. This can reduce the triangular noise associated with the frequency modulation. In addition, this can alleviate a degraded S/N ratio of the FM retransmitted signal due to the degraded quality of the received signal.

Based on the settings at step 14, the control unit 14 outputs the ST/MO switching signal which instructs the stereophonic modulation processing, and the modulation level control signal which instructs a low modulation level to the frequency modulation unit 17. The μCPU terminates the subroutine of FIG. 2 and once returns to the main routine when the settings at step 14 are completed.

On the other hand, if the value of BER is higher than the threshold value B at step 13, the μCPU proceeds to step 15. Then, the μCPU sets the modulation processing mode in the frequency modulation unit 17 to the monophonic modulation processing, and sets the modulation level during the frequency modulation to a minimum. In this event, it is contemplated that the receiving situation of the digital broadcast radio wave has extremely deteriorated, so that the signal quality of the audio signal extracted from a received radio wave is extremely degraded as well, and many noise components are included.

It is possible to maximally reduce the triangular noise associated with the frequency modulation by switching from the stereophonic modulation processing to the monophonic modulation processing, and setting the modulation level to the minimum. Thus, as the μCPU performs such settings at step 15, the degraded S/N ratio can be maximally alleviated when a low quality audio signal is retransmitted as the FM radio wave.

Assume now that the receiving situation is further deteriorated so that the value of BER further increases beyond the threshold value B, and the audio signal can no longer be extracted from the received radio wave. Even in this case, the subroutine in FIG. 2 executes the processing at step 15 in the flow chart. In this event, the retransmitted FM radio wave includes no audio signal, i.e., is mute. Since the monophonic modulation processing causes less noise, as compared with the stereophonic modulation processing, the noise can be limited in a muted FM radio.

The μCPU terminates the subroutine in FIG. 2 when the settings at step 15 are completed.

Generally, the digital broadcasting is characterized in that noise suddenly increases when the error rate exceeds a predetermined value, from a relationship of the error correction processing. According to this embodiment, such noise can be reduced in the audio signal retransmitted through the FM radio wave. Also, spike noise caused by unlocking inherent in the digital broadcasting can also be reduced in a similar manner.

While in the flow chart of FIG. 2, the two threshold values A, B are provided for BER in the control of the modulation level, the present invention is not limited to this. For example, the number of set thresholds may be increased such that the value of modulation level is more finely adjusted in accordance with a varying receiving situation. Alternatively, rather than providing discrete threshold values for BER, a function $Y=f(X)$ may be defined between the value X of BER and the modulation level Y. In this manner, the value of modulation level can be continuously adjusted in accordance with varying BER.

In the flow chart illustrated in FIG. 2, only BER is used as a determination criterion for controlling the modulation level and the switching of modulation processing. This embodiment, however, is not limited to this. For example, the control unit 14 may acquire a received field strength, or a value of C/N ratio in the received radio wave, which can be detected by the analog demodulator unit 11, to switch the modulation level and modulation processing in the frequency modulation unit 17 using such a value as a determination criterion.

In addition, the received field strength and the C/N ratio in the received radio wave may be used in combination with the aforementioned BER as determination criteria.

According to the present invention as described above in detail, in a receiver for retransmitting an audio signal extracted from a received radio wave, on a radio wave different from the received radio wave, the degraded S/N ratio in the radio wave signal during retransmission can be improved even if a receiving situation of the received radio wave deteriorates to cause a lower S/N ratio of the audio signal.

It is understood that the forgoing description and accompanying drawings set forth the preferred embodiments of the invention at the present time. Various modifications, additions, and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of appended claims.

This application is based on a Japanese Patent Application No.2001-70057 which is hereby incorporated by reference.

What is claimed is:

1. A receiver comprising:
    a receiving/reproducing part for receiving a broadcast radio wave and reproducing an audio signal included in the broadcast radio wave;
    a receiving situation determining part for determining the quality of the received broadcast radio wave; and
    a modulating/transmitting part for performing predetermined modulation processing on the audio signal, and transmitting a different broadcast radio wave, which comprises the processed audio signal,
    wherein the predetermined modulation processing controls the modulation level in accordance with the quality of the received broadcast radio wave as determined by said receiving situation determining part.

2. A receiver according to claim 1, wherein said modulating/transmitting part performs frequency modulation processing on the audio signal, transmits the different broadcast radio wave comprising the modulated audio signal, and adjusts the modulation level in the frequency modulation processing in accordance with the quality determined by said receiving situation determining part.

3. A receiver according to claim 2, wherein said modulating/transmitting part is responsive to said receiving situation determining part determining that the quality has deteriorated to a preset amount to reduce the modulation level of the frequency modulation processing from a value utilized when the quality is satisfactory.

4. A receiver according to claim 1, wherein said modulating/transmitting part performs frequency modulation processing, comprising stereophonic modulation processing, on the audio signal during the predetermined modulation processing when the quality is satisfactory, as indicated by the determination result determined by said receiving situation determining part, and transmits the different broadcast radio wave including the modulated audio signal, and said modulating/transmitting part performs frequency modulation processing, comprising monophonic modulation processing, on the audio signal during the predetermined modulation processing when the quality has deteriorated to a preset amount, as indicated by the determination result determined by said receiving situation determining part, and transmits the different broadcast radio wave including the modulated audio signal.

5. A receiver according to claim 1, wherein said modulating/transmitting part performs frequency modulation processing on the audio signal, conducts at least one of minimizing the modulation level of the frequency modulation processing, and monophonic modulation processing on the audio signal, and transmits the different broadcast radio wave including the modulated audio signal, when said receiving situation determining part determines that the receiving situation has deteriorated significantly.

6. A broadcast receiver, comprising:
a broadcast receiving section which receives a radio wave and provides an audio signal included in the received radio wave;
a retransmitting section, including a modulator which modulates the audio signal onto a carrier wave;
a controller which determines the quality of the received radio wave and controls the modulation level of said modulator in accordance with the determined quality; and
an output section which outputs the modulated signal.

7. A broadcast receiver according to claim 6, wherein said controller determines the bit error rate on the received radio wave.

8. A broadcast receiver according to claim 6, wherein said modulator reduces the modulation level when the determined quality has deteriorated beyond a first preset amount.

9. A broadcast receiver according to claim 8, wherein said modulator performs stereophonic modulation processing on the audio signal when the determined quality is above a second preset amount, and monophonic processing on the audio signal when the determined quality has deteriorated beyond the second preset amount.

10. A broadcast receiver according to claim 6, wherein said modulator performs stereophonic modulation processing on the audio signal when the determined quality is satisfactory, and monophonic modulation processing on the audio signal when the determined quality has deteriorated beyond a preset amount.

11. A broadcast receiver according to claim 6, wherein said output section comprises an antenna.

12. A broadcast receiver according to claim 6, wherein said output section comprises a radio receiver.

13. A broadcast receiver according to claim 6, wherein said broadcast receiving section is adapted to receive a digital radio wave.

14. A radio receiving method, comprising:
receiving a first radio wave;
reproducing an audio signal included in the received first radio wave;
determining the quality of the received first radio wave;
performing predetermined modulation processing on the audio signal in accordance with the determined quality of the received first radio wave; and
transmitting a second radio wave, including the processed audio signal,
wherein the modulation processing comprises reducing the modulation level when the determined quality has deteriorated beyond a first preset amount.

15. A radio receiving method according to claim 14, wherein determining the quality of the received first radio wave comprises determining the bit error rate of the received first radio wave.

16. A radio receiving method according to claim 14, wherein the modulation processing further comprises stereophonic modulation processing on the audio signal when the determined quality is above a second preset amount, and monophonic modulation processing on the audio signal when the determined quality has deteriorated beyond the second preset amount.

17. A radio receiving method according to claim 14, wherein the modulation processing further comprises stereophonic modulation processing on the audio signal when the determined quality is satisfactory, and monophonic modulation processing on the audio signal when the determined quality has deteriorated beyond the first preset amount.

18. A radio receiving method according to claim 14, wherein transmitting the second radio wave comprises broadcasting the second radio wave via an antenna.

19. A radio receiving method according to claim 14, wherein transmitting the second radio wave comprises applying the second radio wave to a radio receiver.

* * * * *